United States Patent
Golner et al.

(10) Patent No.: US 6,797,037 B2
(45) Date of Patent: Sep. 28, 2004

(54) DEHYDRATING BREATHER APPARATUS AND METHOD

(75) Inventors: Thomas M. Golner, Pewaukee, WI (US); Shirish P. Mehta, Waukesha, WI (US)

(73) Assignee: Waukesha Electric Systems, Incorporated, Waukesha, WI (US)

(*) Notice: Subject to any disclaimer, the term of this patent is extended or adjusted under 35 U.S.C. 154(b) by 0 days.

(21) Appl. No.: 10/235,795

(22) Filed: Sep. 6, 2002

(65) Prior Publication Data

US 2004/0045435 A1 Mar. 11, 2004

(51) Int. Cl.[7] ............................ B01D 53/02; H01F 27/14
(52) U.S. Cl. ............................ 95/117; 55/417; 55/420; 55/515; 96/134
(58) Field of Search ...................... 96/108, 134, 135, 96/147; 95/117; 55/417, 420, 510, 515, 527, DIG. 17

(56) References Cited

U.S. PATENT DOCUMENTS

| | | | | |
|---|---|---|---|---|
| 2,083,732 A | * | 6/1937 | Moore et al. | 96/126 |
| 2,505,581 A | * | 4/1950 | Unger | 174/14 R |
| 3,572,008 A | * | 3/1971 | Hankison et al. | 95/105 |
| 4,543,446 A | * | 9/1985 | Foss et al. | 174/11 R |
| 5,427,609 A | * | 6/1995 | Zoglman et al. | 95/98 |
| 5,902,381 A | * | 5/1999 | Golner et al. | 96/146 |
| 6,071,321 A | * | 6/2000 | Trapp et al. | 55/318 |
| 6,235,192 B1 | * | 5/2001 | Melfi et al. | 210/136 |

* cited by examiner

Primary Examiner—Frank M. Lawrence
(74) Attorney, Agent, or Firm—Baker & Hostetler LLP

(57) ABSTRACT

A dehydrator breather is provided that includes a vessel, a desiccant container, a valve housing coupled to the vessel, and a vent assembly coupled to the valve housing. The vent assembly includes screened ports disposed along a vertical axis of the vent assembly body that allow air to enter and exit the dehydrator breather. The vent assembly, along with a filter placed between a desiccant container and the valve housing, individually and jointly, prevent desiccant that escapes the desiccant container from clogging the valve assembly.

12 Claims, 3 Drawing Sheets

DEHYDRATING BREATHER APPARATUS AND METHOD

FIELD OF THE INVENTION

This invention pertains generally to dehydrators for removing moisture from air. More particularly, the present invention is directed to dehydrating breathers for power devices.

BACKGROUND OF THE INVENTION

High power electrical equipment, such as large electrical transformers, load tap changers, and circuit breakers, are typically immersed in oil, which is utilized to insulate and cool the power devices. Because the oil expands and contracts with temperature changes, such equipment is provided with a head space above the oil that is vented to the atmosphere to control pressure in, for example, a transformer tank. The pressure in the tank has to be maintained such that air bubbles, which can decrease the dielectric strength of the oil, are inhibited from developing in the oil.

When the heat in the tank increases, the oil in the tank expands, the pressure in the tank increases, and air in the reservoir is forced from the tank. When the tank begins to cool down, the oil in the tank contracts, the pressure in the tank decreases, and air is drawn into the tank to maintain the pressure in the tank.

A dehydrator breather is conventionally utilized to regulate airflow into and out of the tank. In some dehydrating breathers, a vent is provided between the vessel and the outside air. A valve is positioned between the vent and dehydrator breather container that controls the pressure in the tank by opening and closing, as necessary, to control air flow into and out of the tank.

Often, the dehydrator breather includes a desiccant material, such as a silica gel, to remove any moisture from the air before it is allowed into the tank. Water is a conductor, and thus, moisture entering the tank has the capability of destroying the electrical properties of the transformer.

Problems arise, however, when the desiccant escapes the desiccant container. For example, during shipment, the desiccant may break into fine pieces that escape the desiccant container. In addition, desiccant particles may pass through the valve with air that is exiting the dehydrator breather, and become trapped in the valve and/or trapped on top of the vent.

Further, moisture, which evaporates from the drying of the desiccant, often forms condensation on the walls of the dehydrator breather. When the condensation returns to a liquid state, it flows through the valve and out to the atmosphere via the holes in the vent. However, if the desiccant particles are trapped in the valve or clogging the vent, the moisture may become trapped in the vessel and the desiccant may be unable to dry out completely. As a result, the dehydrating breather will not be able to perform its drying functions.

Accordingly, it would be desirable to provide a dehydrator breather that does not allow desiccant particles, which may escape the desiccant container, from disturbing the operation of the dehydrator.

SUMMARY OF THE INVENTION

In one aspect of the present invention, a dehydrator breather is provided that includes a vessel, a valve housing coupled to the vessel, and a vent assembly coupled to the valve housing. The vent assembly includes a vent assembly body, and at least one screened port. The screened port is disposed along a vertical axis of the vent assembly body.

In another aspect of the present invention, a dehydrator breather is provided that includes a vessel, a desiccant container positioned within the vessel, a valve housing, coupled to the vessel, and a filter positioned between the desiccant container and the valve housing.

In another aspect of the present invention, a dehydrator breather is provided that includes a means for regulating air flow through the vessel, a means for removing moisture from air that passes through the regulating means, a means for retaining the moisture removing means within the vessel, and a means for preventing the moisture removing means from interfering with operation of the regulating means. The preventing means is positioned between the returning means and the regulating means.

In another aspect of the present invention, a method for operating a dehydrator breather is provided that includes regulating air through the dehydrator breather utilizing a valve housing, removing moisture from the air utilizing a desiccant, retaining the desiccant in a desiccant container and capturing any desiccant that passes through the desiccant container utilizing a vent assembly. The vent assembly includes a vent body, and at least one screened port positioned on a surface of the vent body.

In yet another aspect of the present invention, a dehydrating breather is provided that includes a vessel, a valve housing coupled to the vessel. The valve housing includes a valve seat formed integrally with the valve housing.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
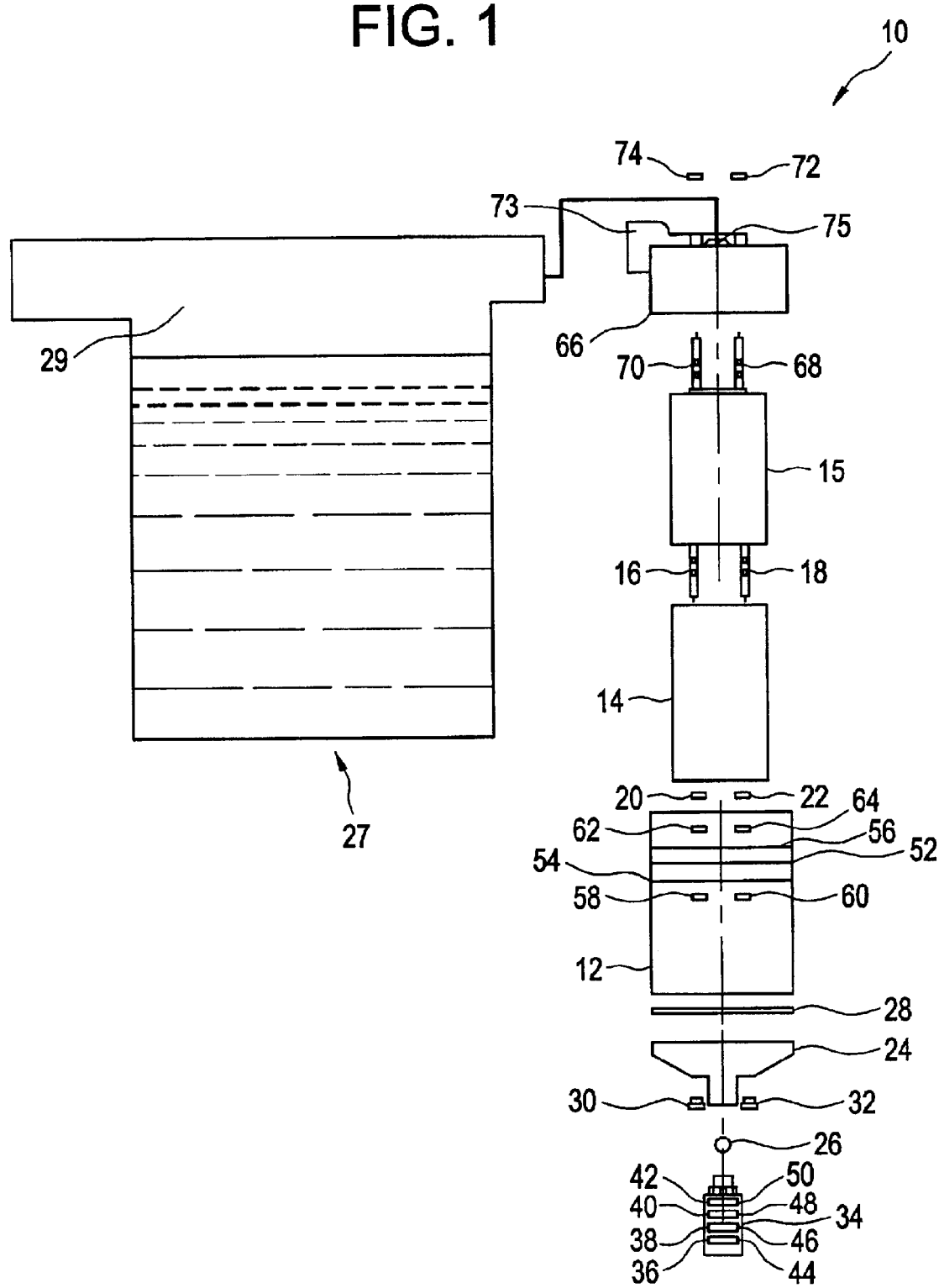
FIG. 1 is an exploded view of a dehydrating breather in accordance with the present invention.

Referring now to FIG. 1 of the figures, wherein like reference numerals indicate like elements, there is shown in FIG. 1 a dehydrating breather 10 in accordance with the present invention. As shown in FIG. 1, the dehydrating breather 10, includes a vessel 12 that, in an exemplary embodiment of the present invention, is formed of a glass or a transparent plastic, such as polycarbonate. In an exemplary embodiment of the present invention, as shown in FIG. 1, the vessel 12 is cylindrical in shape.

A container 14 is mounted within the interior of the vessel 12 and is utilized to contain desiccant. A heater 15 is positioned within the desiccant container 14, and is utilized to drive moisture from the desiccant. In an exemplary embodiment of the present invention, mounting mechanisms 16, 18, for example, threaded screws and locking devices 20, 22, such as bolts, secure the heater 15 to the desiccant container 14.

In an exemplary embodiment of the present invention, the desiccant container 14 is made from a screen material providing openings in the desiccant container 14. In the same or another exemplary embodiment of the present invention, the desiccant is coated with an indicating substance that causes the color of the desiccant to change according to the degree of moisture that it is retaining. The openings in the desiccant container 14 allow the desiccant to be viewed from outside of the desiccant container 14, and thus, allow the condition of the desiccant to be ascertained. The openings in the desiccant container 14 also allow moisture to escape the desiccant container.

Coupled to the bottom of the vessel 12 is a valve housing 24. In an exemplary embodiment of the present invention, the valve housing 24 includes a floating ball 26. The ball 26 fits within the valve housing 24 and controls air flow into and out of the vessel 12, according to a differential in air pressure between the vessel 12 and, for example, a transformer tank 27.

For example, when the oil 29 expands within a transformer tank 27, air in a head space 29 is forced from the transformer tank 27 and into the vessel 12. Accordingly, the air pressure in the transformer tank 27 is greater than the air pressure in the vessel 12. The ball 26 is sufficiently light, such that it moves up, so air can flow from the vessel 12 through the housing 24.

When the air pressure inside of the vessel 12 is greater than the air pressure inside the transformer tank 27, the ball 26 moves upward, so that air can be expelled from the head space 29, through the vessel 12, and out of the housing 24. When the air pressure inside of the vessel 12 is greater than the air pressure inside the transformer tank 27, the ball 26 moves upward to allow air to flow into the housing 24 and/or vent assembly 34, through the vessel 12, and into the head space 29 of the transformer tank 27. When there is no pressure differential between, for example, the transformer tank 27 and the interior of the vessel 12, the ball 26 blocks the admission of air into the vessel 12 to prevent unnecessary admittance of air, which may be moisture-laden, into the dehydrator breather 10 and transformer tank 27.

In an exemplary embodiment of the present invention, a seal 28, for example, a gasket, is provided between the vessel 12 and the housing 24 to prevent moisture from entering the dehydrator breather 10 at the location where the vessel 12 meets the housing 24. In an exemplary embodiment of the present invention, the mounting mechanisms 16, 18 and locking mechanisms 30, 32 are utilized to secure the housing 24 to the vessel 12.

In an exemplary embodiment of the present invention, a vent assembly includes sintered bronze vents. In another exemplary embodiment of the present invention, the vent assembly 34, for example a muffler, is coupled to the valve housing 24. The muffler 34 of the present invention improves the operation of the breather because the sintered bronze vents have fine openings that may trap dessicant particles that escape the dessicant container 14. The muffler 34 and the valve housing 24, in an exemplary embodiment of the present invention, have threaded portions, such that the muffler 34 is threadably attached to the valve housing 24, and can be easily unscrewed from the valve housing 24.

In the same or another exemplary embodiment of the present invention, the muffler 34 has openings, for example, vertically disposed ports 36–42. In an exemplary embodiment of the present invention, the ports 36–42 are covered with screen material 44–50. The screened ports 36–42 allow air to flow into and out of the vessel 12. The screened ports 36–42 also serve to filter particles from the air being drawn into the muffler 34. It should be understood that the number of screens utilized to fully cover the ports 36–42 may vary.

The vent assembly 34 may also be utilized to capture any desiccant particles that may escape the desiccant container 14 and pass through the valve housing 24. In an exemplary embodiment of the present invention, the screen ports 36–42 are disposed along a vertical axis of the vent assembly 34. Thus, if any desiccant particles happen to block one of the screened ports, for example, screened port 36, a screen port positioned above the blocked screen port, such as screened port 38, will still allow air to enter and exit the valve housing 24.

When the vent assembly 34 no longer has the ability to accommodate any additional desiccant particles, the vent assembly 34 can be unscrewed from the valve housing 24, so that the desiccant particles can be emptied. In addition, the vent assembly 34 allows any water that passes through the valve housing to escape through the screened openings. Accordingly, the design of a dehydrator breather in accordance with the present invention prevents desiccant particles from interfering with the flow of air into and out of the valve housing 24.

In an exemplary embodiment of the present invention, fifty mesh stainless steel screen material is utilized for ports 36–42. In an exemplary embodiment of the present invention, the body/vent housing of the vent assembly 34 is made from a plastic material. In an exemplary embodiment of the present invention, the vent assembly is a high flow muffler, manufactured by Adsens Technology of City of Industry, Calif.

In an exemplary embodiment of the present invention, a filter 52 is positioned within the vessel 12. In an exemplary embodiment of the present invention, the filter 52 is made from a fiberglass paper. In the same or another exemplary embodiment of the present invention, supports 54, 56 are utilized to secure the filter 52 within the vessel 12. In an exemplary embodiment of the present invention, the mounting mechanisms 16, 18, are utilized to secure the filter 52 and support screens 54, 56 within the vessel. Securing mechanisms, such as bolts 58-64, are utilized to secure the supports 54, 56 to the filter 52.

The filter 52 prevents desiccant particulate that escapes the desiccant container 14 from entering the valve housing 24. Thus, the filter 52 prevents loose desiccant particulate from plugging the valve housing 24. In addition, moisture which seeks to exit the vessel 12 through the valve housing 24 is prevented from accumulating in the valve housing, and not allowing the desiccant to dry.

A cap 66 is provided to seal the desiccant container. Mounting mechanisms 68, 70 and locking mechanisms 72, 74, for example, threaded screws and bolts, are utilized to secure the cap 66 to the vessel 12 via the heater 15. A connector 73 is provided for connecting the breather 10 to, for example, an auxiliary electrical box to control operations of the heater 15. A port 75 is provided for connecting the dehydrator breather 10 to, for example, the air head space 29 of the transformer tank 27.

Figure 2:
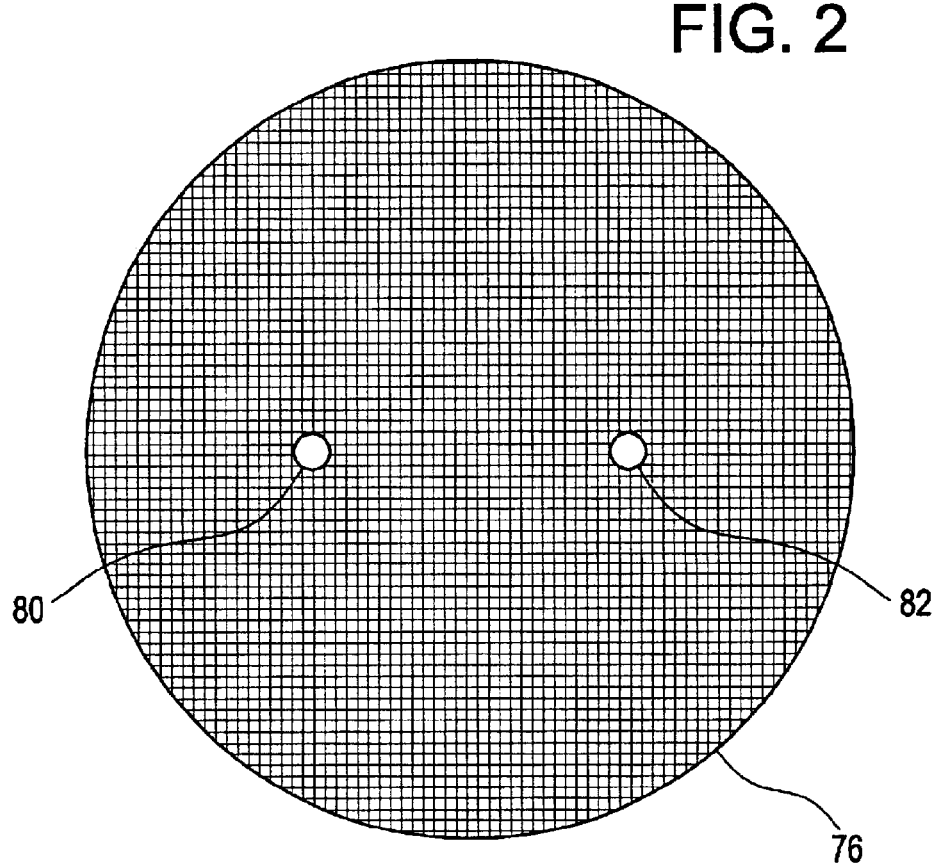
FIG. 2 is a front elevation view of a filter and filter support in accordance with the present invention.
Figure 2:
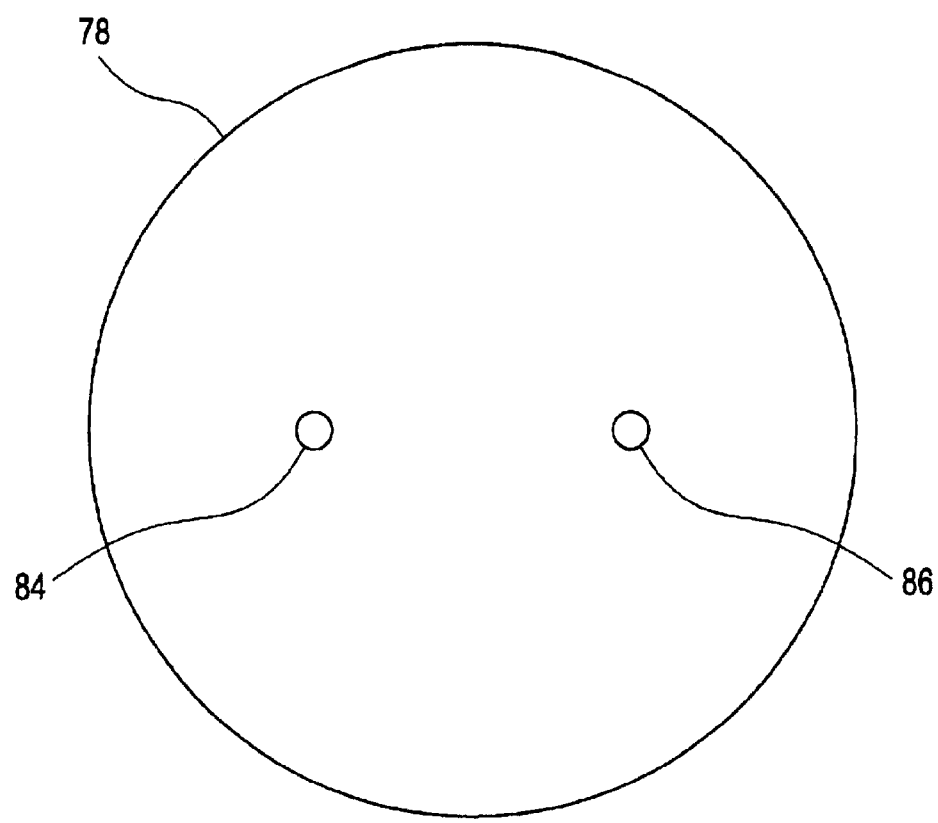

Shown in FIG. 2 is a filter support 76 and filter 78 in accordance with the present invention. Ports 80 and 82 may be provided in the filter support 76 that align with ports 84, 86 of the filter 78. In an exemplary embodiment of the present invention, the filter 78 and filter support 76 are cylindrical in shape. In the same or another exemplary embodiment of the present invention, the filter support 76 is made from a screen material.

Figure 3:
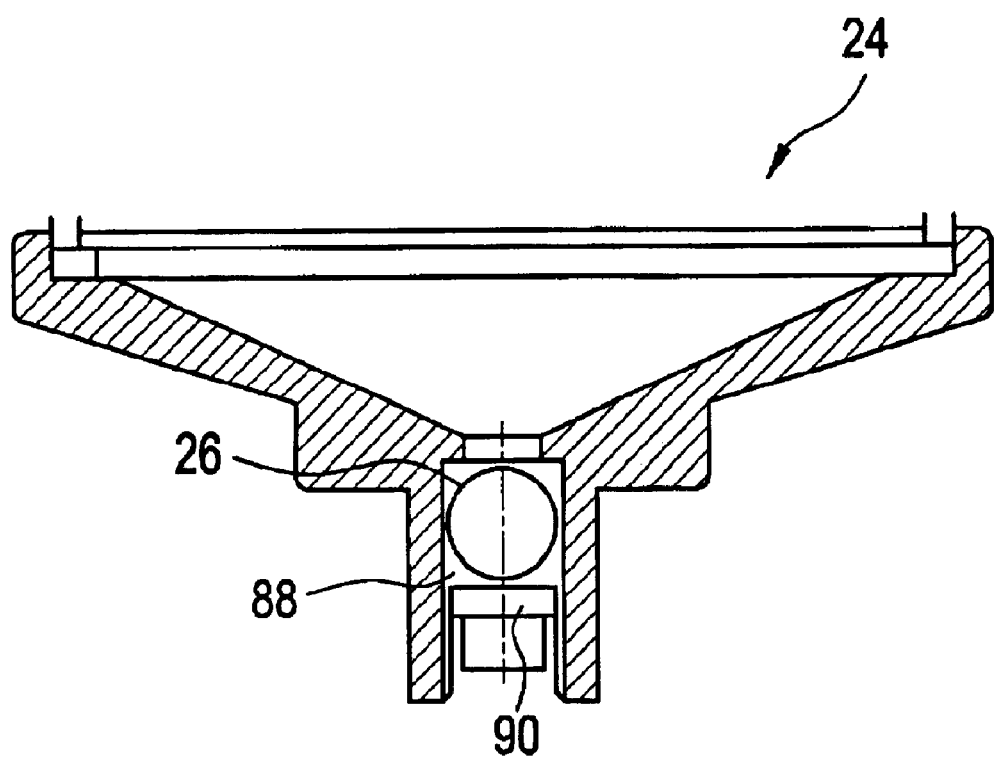
FIG. 3 is a cross-sectional view of a valve housing in accordance with the present invention.

Shown in FIG. 3 is a cross-sectional view of a valve housing 24 in accordance with the present invention. As shown in FIG. 3, a valve 88 is formed with the valve housing 24. In an exemplary embodiment of the present invention, the valve 88 is a floating ball valve where a ball 26 is positioned at valve seat 90.

The dehydrator breather 10 of the present invention prevents desiccant particulate from interfering with airflow into and out of the dehydrating breather. In addition, the dehydrating breather of the present invention prevents desiccant particles from interfering with the flow of water, which may accumulate within the vessel 12, out of the dehydrator breather 10.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dehydrating breather apparatus, comprising:

a vessel;

a desiccant container positioned within the vessel;

a valve housing coupled to the vessel;

a filter positioned between the desiccant container and said valve housing; and a detachable vent assembly coupled to the valve housing to retain loosened desiccant, said vent assembly comprising a vent assembly body having at least a screened port disposed thereon.

2. The dehydrating breather apparatus of claim 1, wherein the filter is made from a fiberglass material.

3. The dehydrating breather apparatus of claim 1, further comprising:

a first filter support, wherein the first filter support supports the filter within the vessel.

4. The dehydrating breather of claim 3, further comprising:

a second filter support, wherein the filter is positioned between the first filter support and the second filter support.

5. The dehydrating breather of claim 3, wherein the first filter support is made from a screen material.

6. A method of operating a dehydrator breather comprising:

regulating bidirectional flow of air through the dehydrating breather utilizing a valve housing;

removing moisture from incoming air with a desiccant;

capturing loose desiccant and the removed moisture with at least a screened port positioned on a surface of a vent body, wherein the vent body is attached to the valve housing and prevents the loose desiccant and removed moisture from interfering with the flow of air.

7. The method of claim 6, further comprising removing the loose desiccant and removed moisture from the vent body.

8. The method of claim 7, wherein the vent body is detachable from the valve housing.

9. A system for operating a dehydrator breather, comprising:

means for regulating air through the dehydrator breather;

means for removing moisture from the incoming air;

means for capturing the removed moisture to prevent it from interfering with the air means for regulating; and means for gravity expelling the removed moisture from the capturing means while securing loosened material from the removing moisture means.

10. The system as in claim 9, further comprising means for removing the means for capturing.

11. The system as in claim 9, wherein the means for capturing comprises a plurality of parts.

12. A dehydrator breather comprising:

a vessel having a first end and a second end;

a desiccant located within the vessel;

a valve housing coupled to the second end of the vessel, the valve housing comprising a floating ball; and a vent assembly coupled to the valve housing, the vent assembly comprising a port disposed thereon.

* * * * *